United States Patent [19]

Bunten

[11] Patent Number: 4,958,730
[45] Date of Patent: Sep. 25, 1990

[54] COMPARTMENTED SUPPORTED FISHING LURE TACKLE BOX

[76] Inventor: Arthur L. Bunten, 6103 Horton Dr., La Mesa, Calif. 92042

[21] Appl. No.: 491,950

[22] Filed: Mar. 12, 1990

[51] Int. Cl.⁵ .............................................. A01K 97/06
[52] U.S. Cl. ............................... 206/315.110; 206/815; 43/57.1; 312/311
[58] Field of Search ................ 312/311, 310, DIG. 33; 211/89, 70.6, 113; 43/54.1, 57.1; 206/315.11, 315.1, 372, 373, 815

[56] References Cited

U.S. PATENT DOCUMENTS

| | | | |
|---|---|---|---|
| 2,608,459 | 8/1952 | Malmquist | 312/351 |
| 2,739,863 | 3/1956 | Ferris | 312/DIG. 33 X |
| 2,846,806 | 8/1958 | Gaines | 43/57.1 |
| 3,133,374 | 5/1964 | Benson | 43/57.1 |
| 3,310,905 | 3/1967 | Davis et al. | 206/315.11 X |
| 3,490,169 | 1/1970 | Tweed | 206/315.11 X |
| 3,797,161 | 3/1974 | Smallwood | 43/57.1 |
| 3,970,010 | 7/1976 | Cantley | 312/311 X |
| 4,023,304 | 5/1977 | Singer | 43/54.1 |
| 4,589,546 | 5/1986 | Sunderland | 43/57.1 X |
| 4,729,474 | 3/1988 | Lanius et al. | 206/315.11 |
| 4,813,173 | 3/1989 | Abbotoy | 43/57.1 |

*Primary Examiner*—Paul T. Sewell
*Assistant Examiner*—Jacob K. Ackun, Jr.
*Attorney, Agent, or Firm*—Andsel Group, Inc.

[57] ABSTRACT

A compartmented, supported fishing lure, tackle box having a plurality of lure storage drawers slidingly disposed within an enclosure is described. The lure storage drawers are rectangular enclosures that have a plurality of elastic retaining means supported from a retainer support means in the top section of the enclosure. The elastic retaining means have an attachment means to which a lure may be suspended. The lure is also placed on a lure holding bar. The lure is thereby firmly supported between the attachment means and the lure holding means. Supported in this manner, the chance of the lure being abraded or scratched while in the tackle box is greatly reduced. The lure storage drawers are constructed of a clear plastic material that allows the user to easily view the lures so the proper lure may be selected. The lure storage drawers have a lure storage drawer retaining means attached to the bottom of the drawer to restrict the sliding movement of the drawer to reduce the possibility of the drawer sliding out accidentally and allowing the lures to be lost or damaged. The tackle box has utility storage drawers to store accessory items to assist in repair of tackle or to add various accessories to fishing equipment. The tackle box has handles for easy handling and the front panel, which provides access to the interior of the box, may be lifted off and stored in a convenient front cover storage slot at the rear of the box.

9 Claims, 1 Drawing Sheet

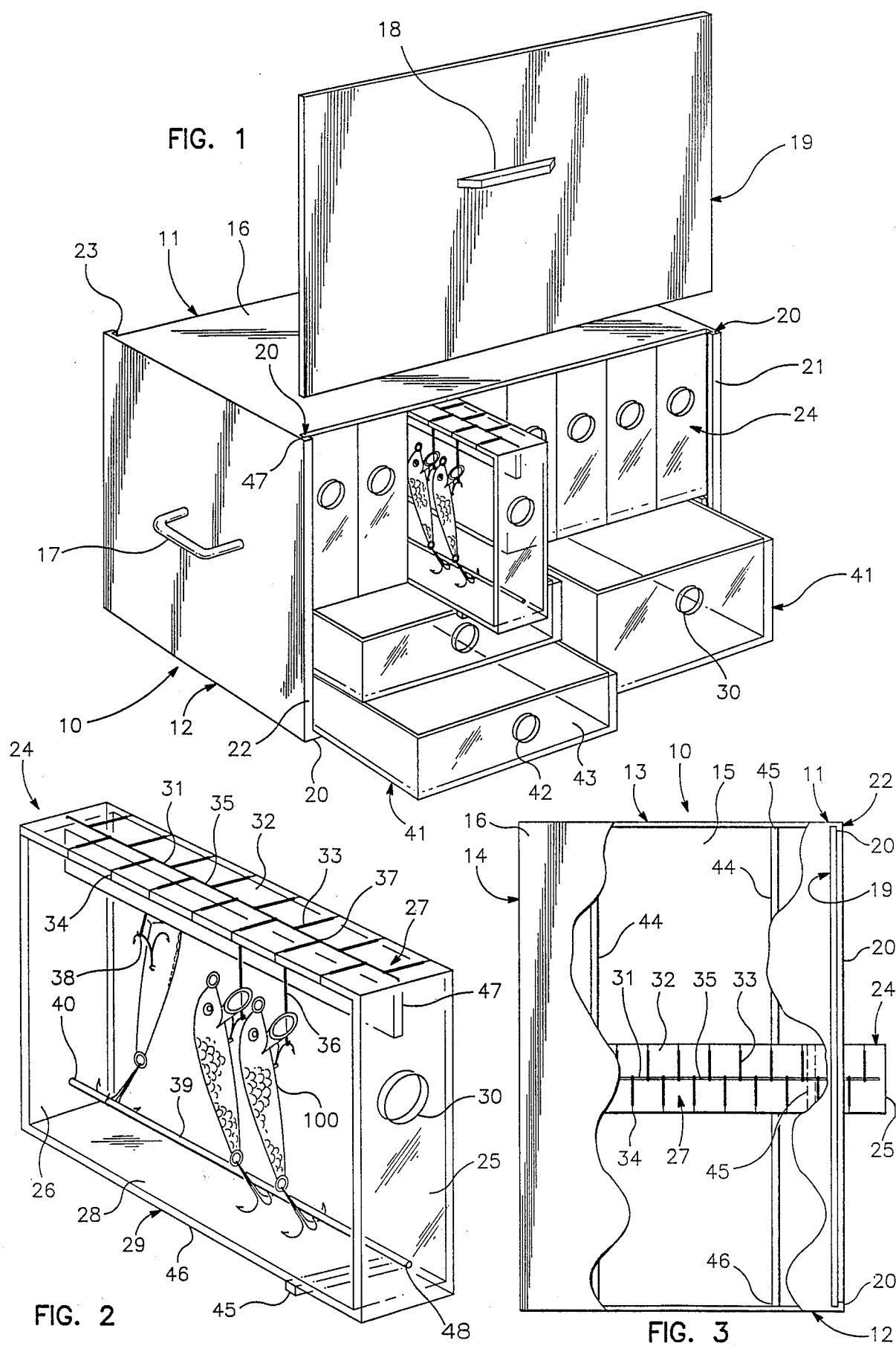

COMPARTMENTED SUPPORTED FISHING LURE TACKLE BOX

BACKGROUND OF THE INVENTION

1. Field of the Invention

This invention relates to a tackle box that is specifically designed for the storage and maintenance of fishing lures The tackle box permits separated storage of individual lures for viewing and selection by the user. The tackle box provides a means to store valuable fishing lures in an orderly manner for ease of selection and to reduce abrasion and other damage to the lures. The tackle box also provides drawers to house fishing tackle accessories for maintenance of the lures and other fishing equipment.

2. Description of the Related Art

An abraded lure body may lose its luster and consequently lose its ability to attract certain species of fish. There are lures designed to attract fresh water and salt water fish. Many times a fisherman will have a favorite lure that for some reason allows him to catch fish when no one else can get a nibble. This lure has a value far beyond the original purchase price and needs to be protected from damage in the tackle box. A lure may be scratched and abraded while wallowing around in the tackle box and the surface elements of that lure that attract fish can be obscured.

U.S. Pat. No. 2,608,459 to R. E. Malmquist on Aug. 26, 1952 describes a tackle box with a plurality of vertical compartments with notched padded supports into which the hooks of the lures are placed and the lures suspended therefrom. The box has multiple drawers for storage and has two sections that are hingingly connected and clasp together to form one piece for transport.

U.S. Pat. No. 4,023,304 to Alex Singer on May 17, 1977 shows a lure-holding tackle box with a plurality of vertical compartments for holding lures and one sectioned drawer.

U.S. Pat. No. 4,729,474 to Charles A. Lanius on Mar. 8, 1988 describes a satchel-style tackle box with longitudinal compartments for holding fishing gear and a sliding drawer. The tackle box folds into a suitcase-like affair.

None of the above tackle boxes secure the lures on elastic means in separate suspension to reduce abrasion nor do they provide the ease of visual reference found in the present invention.

SUMMARY OF THE INVENTION

The present invention tightly secures the lures separately from other lures and equipment. The lures are suspended on elastic means thereby reducing scratching and abrading of the lure's attractive surface, and keeping the hooks of the lures from becoming entangled. This also assures that the lure is always available for viewing and selection through the clear plastic lure drawer. Other common tackle items such as swivels, lead weights, leaders, bobbers and spare hooks can then be stored in the clear plastic utility drawers. The tackle items can be visually referenced for quick repair and preparation for fishing.

The tackle box is comprised of a storage cabinet which has carrying handles on each side. There is a front panel that is lodged in parallel slots that slides off by grasping a handle and exerting an upward force thus permitting access to the lures and tackle accessories. The front panel may be placed in matching slots in the rear panel for storage while accessing the inner portion of the tackle box.

The storage cabinet has an inner structure which has two lure drawer support bars or dual bridging bars to support the lure storage drawers. The dual bridging bars are located immediately above the utility storage drawers. The utility storage drawers slide and rest on the top surface of the bottom panel of the storage cabinet. Both the lure drawers and the utility storage drawers have finger hole pull tabs as an example of a means to control the movement of the drawers.

The lure storage drawers provide a unique means of storing each individual lure to reduce the chance of abrasion and enhance viewing and selection of the lures. Traversing the length and slightly above the bottom section of the lure storage drawer is a rod. In the lure storage drawer, there are two opposed side sections connected by the bottom section and an opposed top panel. The top section is strengthened by a support beam intimately attached to the underside of the top section. The upper section has a longitudinal slot with several lateral slots extending from it.

A tackle box is described that has an enclosure that has two opposing side panels and a rear panel, a removable front panel opposite the rear panel, a bottom panel and a top panel opposite the bottom panel. There is a first front panel retaining means on a front of the enclosure to retain the front panel in place over a front opening of the enclosure.

There are a plurality of lure storage drawers slidingly disposed within the enclosure. The lure storage drawers have a first side section and a second side section parallel to and diametrically opposing each other and have both side sections attached to a top section and have a bottom section, parallel to the top section, to form a rectangular lure enclosure. There is a first drawer pull means in the second side section of the lure storage drawers. A longitudinal slot is located in an upper surface of the top section of the lure storage drawer. The longitudinal slot has lateral slots extending therefrom.

A retainer support is located in the longitudinal slot and there are a plurality of elastic retainers with one end attached to the retainer support placed in the lateral slots. The elastic retainers have a length longer than the lateral slots. There is a lateral slit connected to the lateral slot and the elastic retainer passes down through the lateral slit and into the rectangular lure enclosure. An attachment means is located on an other end of the elastic retainers to attach a lure. There is a lure holding bar parallel to the bottom section of the lure storage drawer and one end of the lure holding bar is attached to a first side section and the other end attached to a second side section. The lure holding bar traverses a distance between the first and second side section of the lure storage drawer.

The longitudinal slot may be approximately equal in length to the length of the upper surface and parallel to the longitudinal axis of the upper surface. There may be a first handle means on each of the side panels to lift the enclosure. There may be a second handle means on the front panel to remove and replace the front panel of the enclosure.

A second front panel retaining means may be placed on the rear panel to store the front panel when the front panel is not in place over the front opening.

There may be a lure storage drawer retaining means on a bottom surface of the bottom section of the lure storage drawer to restrict the sliding movement of the lure storage drawer. There may be at least two lure drawer support bars on the same horizontal plane immediately above the utility storage drawers and parallel to the bottom panel. One end of the lure storage drawer support bars may be attached to the first side panel of the enclosure and the other end attached to the second side panel of the enclosure. The lure drawer support bars may traverse a distance between the first and second side panels to support the lure drawers in the enclosure to restrict the movement of the lure storage drawer retaining means.

It is therefore an object of this invention to provide a tackle box that allows the user to store the lures in a manner that reduces the chance that the lures will be abraded or scratched and yet provides the user with a way to easily view the lures for selection.

It is yet another object of this invention to provide a tackle box that is easy and convenient to use and that provides utility drawers that are easily accessible and that store items to repair the lures or other fishing tackle.

BRIEF DESCRIPTION OF THE DRAWINGS

FIG. 1 is a perspective view of the tackle box with the front panel lifted off and showing some of the drawers pulled out.

FIG. 2 is a perspective view of a lure storage drawer showing several lures suspended therein.

FIG. 3 is a top view partly in section showing a lure storage drawer and the support bars upon which the lure storage drawers slide.

DETAILED DESCRIPTION OF THE PREFERRED EMBODIMENT

Referring to FIGS. 1, and 3, a tackle box 10 is shown. The tackle box 10 has an enclosure 11 that has two opposing side panels 12 and 13. The enclosure 11 also has a rear panel 14, a removable front panel 19 opposite the rear panel 14, a bottom panel 15 and a top panel 16 opposite the bottom panel 15. There is a first handle means 17 on each of the side panels 12 and 13 to lift the enclosure 11. There is a second handle means 18 on the front panel 19 to remove and replace the front panel 19 of the enclosure 11. There is a first front panel retaining means 20 on a front 22 of the enclosure 11 to retain the front panel 19 when the front panel 19 is in place over a front opening 21 of the enclosure. The first front panel retaining means 20 is, in the preferred embodiment of the tackle box 10, a slot 47 cut into or attached to the side panels 12 and 13 and the bottom panel 15, on the sides and on the bottom of the front opening 21. The retaining means 20 is open at the top so that the front panel 19 may be inserted. A second front panel retaining means 23, similar to the first front panel retaining means 20, is on the rear panel 14 and is used to store the front panel 19 when the front panel 19 is not in place over the front opening 21.

There are a plurality of lure storage drawers 24 slidingly disposed within the enclosure 11. The lure storage drawers 24 have a first side section 25 and a second side section 26 parallel to and diametrically opposing each other, and have both sides attached to a top section 27. The lure storage drawer 24 has a bottom section 28 parallel to the top section 27 to which both side sections are attached. The two sides, top and bottom form a rectangular lure enclosure 29. There is a first drawer pull means 30 (in the preferred embodiment it is a finger hole) in one side section 25 of the lure storage drawer.

There is a longitudinal slot 31 in an upper surface 32 of the top section 27 that has lateral slots 33 extending therefrom. The longitudinal slot 31 is approximately equal in length to the length of the upper surface 32 and parallel to the longitudinal axis of the upper surface 32. There are a plurality of lateral slits 34 through the top section 27 that are connected to the lateral slots 33. Each lateral slot 33 has a lateral slit 34 extending therefrom. The top section 27 is strengthened by beam support 47.

A retainer support 35 (In the preferred embodiment, it is a wire) is placed in the longitudinal slot 31. There are a plurality of elastic retainers 36 that have one end 37 attached to the retainer support 35. The elastic retainers 36 are placed in the lateral slots 33. The elastic retainers 36 are long enough to extend from the retainer support 35, pass through the lateral slot 33, through the lateral slit 34 and down into the rectangular lure enclosure 29. There is an attachment means 37 (a loop in the preferred embodiment) on another end 38 of the elastic retainers 36 to attach a lure 100.

Parallel to the bottom section 22 of the lure storage drawer 24 is a lure holding bar 39. The lure holding bar 39 is attached at one end 40 to a first side section 24 and the other end 48 is attached to a second side section 25. The lure holding bar 39 traverses the distance between the first and the second side section of the lure storage drawer 24. There is a lure storage drawer retaining means 45 on a bottom surface 46 of the bottom section 28 of the lure storage drawer 24 to restrict the sliding movement of the lure storage drawer 24.

There are a plurality of utility storage drawers 41 that are slidingly disposed within the enclosure 11. The utility storage drawers are immediately adjacent the lure storage drawers. The utility storage drawers have a second drawer pull means 42, similar to the first drawer pull means 30, in a front section 43 of the utility storage drawers 41.

There are at least two lure drawer support bars 44, located on the same horizontal plane, immediately above the utility storage drawers 41. The lure storage drawer support bars 44 are parallel to the bottom panel 15. One end 45 (both bar are similar and are similarly placed apart and parallel to each other and the numbers refer to both bars) of the lure storage drawer support bars 44 is attached to a first side panel 12 and the other end 46 of the two bars 44 is attached to a second side panel. The bars 44 traverse the distance between the first side panel 12 and the second side panel 13 to support the lure storage support drawers 24 in the enclosure 11. The bars 44 also serve to restrict the movement of the lure storage drawer retaining means 45 (a bar attached to the bottom surface 46 of lure storage drawer 24, see FIG. 2).

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A tackle box comprising:
   a. an enclosure having two opposing side panels and a rear panel, a removable front panel opposite the rear panel, a bottom panel and a top panel opposite the bottom panel;

b. a first front panel retaining means on a front of the enclosure to retain the front panel in place over a front opening of the enclosure;
c. a plurality of lure storage drawers slidingly disposed within the enclosure;
d. the lure storage drawers comprising a first side section and a second side section parallel to and diametrically opposing each other, and having both side sections attached to a top section and a bottom section, parallel to the top section, to form a rectangular lure enclosure;
e. a first drawer pull means in the second side section of the lure storage drawers to facilitate slidable movement of the lure storage drawers;
f. a longitudinal slot in an upper surface of the top section having lateral slots extending therefrom;
g. lateral slits through the top section connected to the lateral slots;
h. a retainer support in the longitudinal slot;
i. a plurality of elastic retainers with one end attached to the retainer support and placed in the lateral slots and having a length longer than the lateral slots;
j. the elastic retainers passing down through the lateral slits into the rectangular lure enclosure;
k. an attachment means on an end of the elastic retainers to attach a lure; and
l. a lure holding bar parallel to the bottom section of the lure storage drawer and with one end of the lure holding bar attached to the first side section and the other end attached to the second side section and traversing a distance between the first and second side section of the lure storage drawer.

2. A tackle box as described in claim 1 further comprising a first handle means on each of the side panels to lift the enclosure.

3. A tackle box as described in claim 1 further comprising a second handle means on the front panel to remove and replace the front panel of the enclosure.

4. A tackle box as described in claim 1 further comprising a second front panel retaining means on the rear panel to store the front panel when the front panel is not in place over the front opening.

5. A tackle box as described in claim 1 wherein the longitudinal slot further comprises being approximately equal in length to the length of the upper surface and parallel to the longitudinal axis of the upper surface.

6. A tackle box comprising:
a. an enclosure having two opposing side panels and a rear panel, a removable front panel opposite the rear panel, a bottom panel and a top panel opposite the bottom panel;
b. a first handle means on each of the side panels to lift the enclosure;
c. a second handle means on the front panel to remove and replace the front panel of the enclosure;
d. a first front panel retaining means on a front of the enclosure to retain the front panel in place over a front opening of the enclosure;
e. a second front panel retaining means on the rear panel to store the front panel when the front panel is not in place over the front opening;
f. a plurality of lure storage drawers slidingly disposed within the enclosure;
g. the lure storage drawers comprising a first side section and a second side section parallel to and diametrically opposing each other, and having both side sections attached to a top section and a bottom section, parallel to the top section, to form a rectangular lure enclosure;
h. a first drawer pull means in the second side section of the lure storage drawers to facilitate slidable movement of the lure storage drawers;
i. a longitudinal slot in an upper surface of the top section, approximately equal in length to the length of the upper surface and parallel to the longitudinal axis of the upper surface, having lateral slots extending therefrom;
j. lateral slits through the top section connected to the lateral slots;
k. a retainer support in the longitudinal slot;
l. a plurality of elastic retainers with one end attached to the retainer support and placed in the lateral slots and having a length longer than the lateral slots;
m. the elastic retainers passing down through the lateral slits into the rectangular lure enclosure;
n. an attachment means on an opposite end of the elastic retainers to attach a lure;
o. a lure holding bar parallel to the bottom section of the lure storage drawer and with one end of the lure holding bar attached to a first side section and the other end attached to a second side section and traversing a distance between the first and second side section of the lure storage drawer; and
p. a plurality of utility storage drawers slidingly disposed within the enclosure and immediately adjacent the lure storage drawers and having a second drawer pull means in a front section of the utility storage drawers to facilitate slidable movement of the utility storage drawers.

7. A tackle box as described in claim 6 further comprising a lure storage drawer retaining means on a bottom surface of the bottom section of the lure storage drawer to restrict the sliding movement of the lure storage drawer.

8. A tackle box as described in claim 7 further comprising at least two lure drawer support bars on the same horizontal plane immediately above the utility storage drawers and parallel to the bottom panel and with one end of the lure storage drawer support bars attached to a first side panel and the other end attached to a second side panel and traversing a distance between the first and second side panel to support the lure drawers in the enclosure to restrict the movement of the lure storage drawer retaining means.

9. A tackle box comprising:
a. an enclosure having two opposing side panels and a rear panel, a removable front panel opposite the rear panel, a bottom panel and a top panel opposite the bottom panel;
b. a first handle means on each of the side panels to lift the enclosure;
c. a second handle means on the front panel to remove and replace the front panel of the enclosure;
d. a first front panel retaining means on a front of the enclosure to retain the front panel in place over a front opening of the enclosure;
e. a second front panel retaining means on the rear panel to store the front panel when the front panel is not in place over the front opening;
f. a plurality of lure storage drawers slidingly disposed within the enclosure;
g. the lure storage drawers comprising a first side section and a second side section parallel to and diametrically opposing each other, and having both side sections attached to a top section and a bottom section, parallel to the top section, to form a rectangular lure enclosure;

h. a first drawer pull means the second side section of the lure storage drawers to facilitate slidable movement of the lure storage drawers;

i. a longitudinal slot in an upper surface of the top section, approximately equal in length to the length of the upper surface and parallel to the longitudinal axis of the upper surface, having lateral slots extending therefrom;

j. lateral slits through the top section connected to the lateral slots;

k. a retainer support in the longitudinal slot;

l. a plurality of elastic retainers with one end attached to the retainer support and placed in the lateral slots and having a length longer than the lateral slots;

m. the elastic retainers passing down through the lateral slits into the rectangular lure enclosure;

n. an attachment means on an opposite end of the elastic retainers to attach a lure;

o. a lure holding bar parallel to the bottom section of the lure storage drawer and with one end of the lure holding bar attached to a first side section and the other end attached to a second side section and traversing a distance between the first and second side section of the lure storage drawer;

p. a lure storage drawer retaining means on a bottom surface of the bottom section of the lure storage drawer to restrict the sliding movement of the lure storage drawer;

q. a plurality of utility storage drawers slidingly disposed within the enclosure and immediately adjacent the lure storage drawers and having a second drawer pull means in a front section of the utility storage drawers to facilitate slidable movement of the utility storage drawers; and r. at least two lure drawer support bars on the same horizontal plane immediately above the utility storage drawers and parallel to the bottom panel and with one end of the lure storage drawer support bars attached to the first side panel of the enclosure 11 and the other end attached to the second side panel of the enclosure and traversing a distance between the first and second side panel to support the lure drawers in the enclosure to restrict the movement of the lure storage drawer retaining means.

* * * * *